US009163574B2

(12) United States Patent
Aoki et al.

(10) Patent No.: US 9,163,574 B2
(45) Date of Patent: Oct. 20, 2015

(54) SENSOR CHARACTERISTIC CORRECTION DEVICE

(75) Inventors: Keiichiro Aoki, Suntou-gun (JP); Takanori Sasaki, Susono (JP); Go Hayashita, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 8 days.

(21) Appl. No.: 14/006,405

(22) PCT Filed: May 24, 2011

(86) PCT No.: PCT/JP2011/061882
§ 371 (c)(1), (2), (4) Date: Sep. 20, 2013

(87) PCT Pub. No.: WO2012/160651
PCT Pub. Date: Nov. 29, 2012

(65) Prior Publication Data
US 2014/0005882 A1 Jan. 2, 2014

(51) Int. Cl.
*F02D 41/24* (2006.01)
*F02D 41/06* (2006.01)
*F02D 41/14* (2006.01)
*G01M 17/00* (2006.01)
*G06F 19/00* (2011.01)

(52) U.S. Cl.
CPC .......... *F02D 41/1438* (2013.01); *F02D 41/062* (2013.01); *F02D 41/1441* (2013.01); *F02D 41/1456* (2013.01); *F02D 41/2474* (2013.01)

(58) Field of Classification Search
None
See application file for complete search history.

(56) References Cited

U.S. PATENT DOCUMENTS

| | | | | |
|---|---|---|---|---|
| 5,610,321 | A * | 3/1997 | Shinmoto | 73/23.32 |
| 5,617,722 | A * | 4/1997 | Takaku | 60/277 |
| 5,619,976 | A * | 4/1997 | Kitagawa et al. | 123/679 |
| 5,797,384 | A * | 8/1998 | Kitagawa et al. | 123/674 |
| 6,202,406 | B1 * | 3/2001 | Griffin et al. | 60/274 |
| 6,651,422 | B1 * | 11/2003 | LeGare | 60/277 |
| 7,707,821 | B1 * | 5/2010 | Legare | 60/277 |
| 2001/0015066 | A1 * | 8/2001 | Takaku et al. | 60/285 |
| 2003/0019485 | A1 | 1/2003 | Kobayashi et al. | |
| 2008/0178853 | A1 * | 7/2008 | Yamaoka et al. | 123/568.11 |
| 2009/0288391 | A1 * | 11/2009 | Aoki | 60/273 |
| 2011/0077840 | A1 * | 3/2011 | Nishigaki | 701/104 |
| 2013/0218442 | A1 * | 8/2013 | Miyaji et al. | 701/108 |

FOREIGN PATENT DOCUMENTS

| | | | |
|---|---|---|---|
| JP | 6-280662 | A | 10/1994 |
| JP | 8-177605 | A | 7/1996 |
| JP | 8-291739 | A | 11/1996 |
| JP | 2003-41990 | A | 2/2003 |
| JP | 2004-36464 | A | 2/2004 |
| JP | 2008-57481 | A | 3/2008 |
| JP | 2010-7534 | A | 1/2010 |

* cited by examiner

*Primary Examiner* — Calvin Cheung
*Assistant Examiner* — Krishnan Ramesh
(74) *Attorney, Agent, or Firm* — Sughrue Mion, PLLC

(57) ABSTRACT

A sensor characteristic correction device is configured to detect a characteristic of a first sensor arranged upstream of a catalyst 6 in an exhaust passage 4 of an internal combustion engine 2, and a characteristic of a second sensor that is an air-fuel sensor 12 arranged downstream of the catalyst 6, to calculate a first air-fuel ratio based on the characteristic of the first sensor, and calculates a second air-fuel ratio based on the characteristic of the second sensor, to detect, when the catalyst 6 is in an inactive state after start-up of the internal combustion engine 2, a difference between the first characteristic and the second characteristic or a difference between the first air-fuel ratio and the second air-fuel ratio, and to correct the responsiveness of the first or the second sensor in accordance with the difference.

6 Claims, 9 Drawing Sheets

SENSOR CHARACTERISTIC CORRECTION DEVICE

CROSS REFERENCE TO RELATED APPLICATIONS

This application is a National Stage of International Application No. PCT/JP2011/061882 filed May 21, 2011, the contents of all of which are incorporated herein by reference in their entirety.

TECHNICAL FIELD

This invention relates to a sensor characteristic correction device. More specifically, this invention relates to a characteristic correction device that corrects characteristics of sensors that are arranged at positions before and after a catalyst that is disposed in an exhaust passage of an internal combustion engine.

BACKGROUND ART

For example, in Patent Literature 1, a failure detection apparatus of an air-fuel ratio control apparatus which includes air-fuel ratio sensors disposed at positions before and after a catalyst, respectively, is disclosed. In this apparatus, a difference between the outputs of the air-fuel ratio sensors disposed before and after the catalyst is used to determine a failure of the air-fuel ratio sensor that is arranged on the upstream side or a failure of a catalytic converter. Further, in this apparatus, the output of the air-fuel ratio sensor on the downstream side is corrected based on a standard output, and the output of the air-fuel ratio sensor on the upstream side is corrected using the air-fuel ratio sensor on the downstream side.

CITATION LIST

Patent Literature

Patent Literature 1: Japanese Patent Laid-Open No. 6-280662

Patent Literature 2: Japanese Patent Laid-Open No. 2003-041990

Patent Literature 3: Japanese Patent Laid-Open No. 2010-007534

Patent Literature 4: Japanese Patent Laid-Open No. 2008-057481

SUMMARY OF INVENTION

Technical Problem

If differences arise between the characteristics of air-fuel ratio sensors positioned before and after a catalyst due to manufacturing errors or deterioration or the like of the air-fuel ratio sensors, the output errors between the air-fuel ratio sensors will influence the respective control parameters thereof. Consequently, in catalyst failure detection that is performed based on the outputs of air-fuel ratio sensors positioned before and after a catalyst, a situation can occur in which an S/N ratio of a normality or abnormality determination becomes narrow. Therefore, a system is desirable that can correct a deviation in characteristics between sensors positioned before and after a catalyst or a deviation in an air-fuel ratio that occurs due to such a deviation.

In this regard, according to the system disclosed in Patent Literature 1, a limiting-current-type air-fuel ratio sensor is arranged at a position before the catalyst, and an electromotive force-type air-fuel ratio sensor is arranged at a position after the catalyst. In this case, it is difficult to correct a deviation between the characteristics of the electromotive force-type air-fuel ratio sensor and the limiting-current-type air-fuel ratio sensor.

Accordingly, an object of the present invention is to solve the above described problem, and the present invention provides a sensor characteristic correction device that has been improved so as to be capable of correcting a deviation between two sensors for detecting air-fuel ratio that are arranged at positions before and after a catalyst.

Solution to Problem

To achieve the above described object, the present invention provides a sensor characteristic correction device that includes characteristic detection means, calculation means, difference detection means, and correction means. The characteristic detection means detects a characteristic of a first sensor that is arranged upstream of a catalyst in an exhaust passage of an internal combustion engine, and a characteristic of a second sensor that is an air-fuel ratio sensor that is arranged downstream of the catalyst. The calculation means calculates a first air-fuel ratio based on the characteristic of the first sensor and calculates a second air-fuel ratio based on the characteristic of the second sensor. The difference detection means detects a difference between the first characteristic and the second characteristic or a difference between the first air-fuel ratio and the second air-fuel ratio at a time that the catalyst is in an inactive state after start-up of the internal combustion engine. In accordance with the difference, the correction means corrects the characteristic of the first sensor and/or the second sensor so that the first air-fuel ratio and the second air-fuel ratio become the same.

Here, the first sensor may be an air-fuel ratio sensor. In this case, a configuration may be adopted in which, as the characteristic of the first sensor and the characteristic of the second sensor, the characteristic detection means detects respective outputs thereof, and the difference detection means detects a difference between the output of the first sensor and the output of the second sensor. In this case, the correction means may be configured to correct the output of the first sensor and/or the second sensor in accordance with the difference.

Further, in a case where the characteristic detection means detects the respective outputs as the characteristics, a configuration may also be adopted in which, as well as correcting the output, the correction means also corrects a responsiveness of the first sensor and/or the second sensor in accordance with the difference between the outputs.

A configuration may be adopted in which the first sensor is an air-fuel ratio sensor, and in which, as the characteristic of the first sensor and the second sensor, the characteristic detection means detects responsiveness, respectively. In this case, the difference detection means may be configured to detect a difference between the responsiveness of the first sensor and the responsiveness of the second sensor; and the correction means may be configured to correct the responsiveness of the first sensor and/or the second sensor in accordance with the difference.

Further, in case of the above, the correction means may be configured to take the characteristic of the second sensor as a standard, and to correct the characteristic of the first sensor so that the first air-fuel ratio becomes the same as the second air-fuel ratio.

A configuration may be adopted in which the first sensor is an in-cylinder pressure sensor, and in which the difference detection means detects a difference between the first air-fuel ratio and the second air-fuel ratio. In this case, the correction means may be configured to correct the first air-fuel ratio in accordance with the difference.

Further, in case that the first sensor is an in-cylinder pressure sensor, the difference detection means may be configured to detect differences between the first air-fuel ratio and the second air-fuel ratio, when the internal combustion engine is in an operating state with EGR and when the internal combustion engine is in an operating state without EGR, respectively. In this case, the correction means may be configured to compare the difference in the operating state with EGR and the difference in the operating state without EGR, and to calculate a correction coefficient with respect to an EGR amount in the operating state with EGR.

A configuration may be adopted in which the first sensor is an in-cylinder pressure sensor, and in which air-fuel ratio control means that, when the catalyst is in an inactive state after start-up of the internal combustion engine, controls an air-fuel ratio of the internal combustion engine to be a predetermined rich air-fuel ratio. In this case, the difference detection means may be configured to detect a difference between the first air-fuel ratio and the second air-fuel ratio in a case where the air-fuel ratio is controlled to the rich air-fuel ratio.

In the above cases, the sensor characteristic correction device may further includes an air-fuel ratio control means that, when the catalyst is in an inactive state after start-up of the internal combustion engine, controls an air-fuel ratio of the internal combustion engine to a predetermined rich air-fuel ratio or lean air-fuel ratio. In this case, the difference detection means may be configured to detect a difference between the characteristic of the first sensor and the characteristic of the second sensor or a difference between the first air-fuel ratio and the second air-fuel ratio in a case where the air-fuel ratio is controlled to the rich air-fuel ratio or lean air-fuel ratio.

Advantageous Effects of Invention

According to the present invention, when a catalyst is inactive, by utilizing a case where the concentration of exhaust gas before and after the catalyst match, a difference between the characteristics of a first and a second sensor or a difference between air-fuel ratios that are based thereon is detected, and based on the difference, air-fuel ratios that are based on the two sensors can be corrected so as to match. Therefore, even when a difference arises between characteristics or between calculated air-fuel ratios due to deterioration of a sensor or the like, the difference can be corrected so that the characteristics or air-fuel ratios of the sensors that are positioned before and after the catalyst match. Accordingly, processing such as processing to determine catalyst deterioration can be executed with higher accuracy.

In this case, with respect to a configuration in which an air-fuel ratio sensor is used as the first sensor and which detects a difference between the outputs of the two air-fuel ratio sensors at a time of catalytic inactivity, output correction can be performed based on the detected value so that the output characteristics of the two air-fuel ratio sensors become the same. In addition, with respect to a configuration that detects a difference in the outputs or a difference in the responsiveness of the two air-fuel ratio sensors at a time of catalytic inactivity, it is possible to correct the responsiveness of the two air-fuel ratio sensors based on the detected value.

The first air-fuel ratio sensor that is arranged upstream of the catalyst takes a high-concentration and high-temperature exhaust gas as a detection object. On the other hand, the second air-fuel ratio sensor that is arranged downstream of the catalyst takes a low-concentration and low-temperature exhaust gas as a detection object. Accordingly, the second air-fuel ratio sensor produces less deterioration than the first air-fuel ratio sensor. In this regard, according to the present invention, in a configuration which corrects a characteristic of the first air-fuel ratio sensor by taking a characteristic of the second air-fuel ratio sensor as a standard, the characteristic of the air-fuel ratio sensor can be corrected more exactly.

In addition, an air-fuel ratio that is based on the output of an in-cylinder pressure sensor is calculated using a calculation coefficient or the like that has been previously set. However, in this case, variations arise in the air-fuel ratio due to the operating state of the internal combustion engine, fuel properties, and changes over time and the like. In this regard, with respect to a configuration in which the first sensor is an in-cylinder pressure sensor according to the present invention, by utilizing a state prior to catalytic activity, the air-fuel ratio can be corrected based on the in-cylinder pressure sensor that is the first sensor, based on the output of the air-fuel ratio sensor on the downstream side of the catalyst. Accordingly, even when an air-fuel ratio sensor is not arranged upstream of the catalyst, the air-fuel ratio can be detected with high accuracy by means of the in-cylinder pressure sensor.

DESCRIPTION OF EMBODIMENTS

Figure 1:
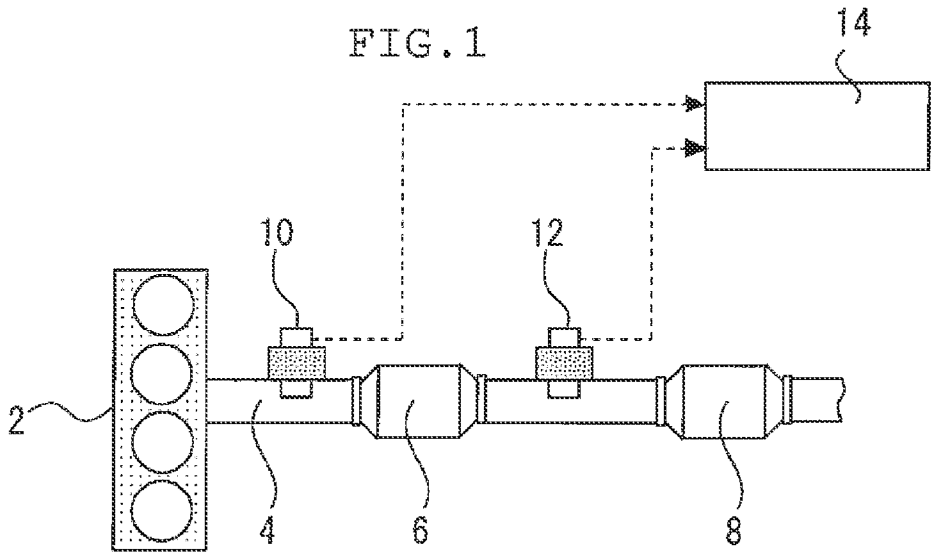
FIG. 1 is a schematic diagram for describing the overall configuration of a system according to Embodiment 1 of the present invention.

Embodiments of the present invention are described hereunder with reference to the drawings. For each of the drawings, the same or corresponding portions are denoted by the same reference numerals, and a description of such portions is simplified or omitted.

Embodiment 1

FIG. 1 is a schematic diagram for describing the overall configuration of a system according to Embodiment 1 of the present invention. The system shown in FIG. 1 is mounted and used in a vehicle or the like. In FIG. 1, catalysts 6 and 8 are arranged in an exhaust passage 4 of an internal combustion engine 2.

An air-fuel ratio sensor 10 (first sensor) is arranged on an upstream side of the catalyst 6 in the exhaust passage 4. An air-fuel ratio sensor 12 (second sensor) is arranged at a position that is on a downstream side of the catalyst 6 and is on an upstream side of the catalyst 8 in the exhaust passage 4. Both of the air-fuel ratio sensors 10 and 12 are limiting-current-type sensors, and output a limiting current (IL) as an output in accordance with the air-fuel ratio of the exhaust gas that is the detection object. Note that, for convenience, in the following embodiments the air-fuel ratio sensor 10 on the upstream side of the catalyst 6 may also be referred to as "Fr sensor 10" and the air-fuel ratio sensor 12 on the downstream side of the catalyst 6 may also be referred to as "Rr sensor 12".

The system shown in FIG. 1 includes a control apparatus 14. The control apparatus 14 performs overall control of the entire system of the internal combustion engine 2. Various actuators are connected to an output side of the control apparatus 14, and various sensors such as the air-fuel ratio sensors 10 and 12 are connected to an input side thereof. The control apparatus 14 receives signals from the sensors to thereby detect the air-fuel ratio of exhaust gas, the number of engine revolutions, and various other kinds of information that is required for operation of the internal combustion engine 2, and operates the respective actuators in accordance with a predetermined control program. Note that although a large number of actuators and sensors are connected to the control apparatus 14, a description of such actuators and sensors is omitted in the present specification.

Control that the control apparatus 14 executes in this system includes correcting the sensor outputs as characteristics of the air-fuel ratio sensors 10 and 12. Correction of the outputs of the air-fuel ratio sensors 10 and 12 is executed when the catalyst 6 is in an inactive state after start-up of the internal combustion engine 2.

Figure 2:
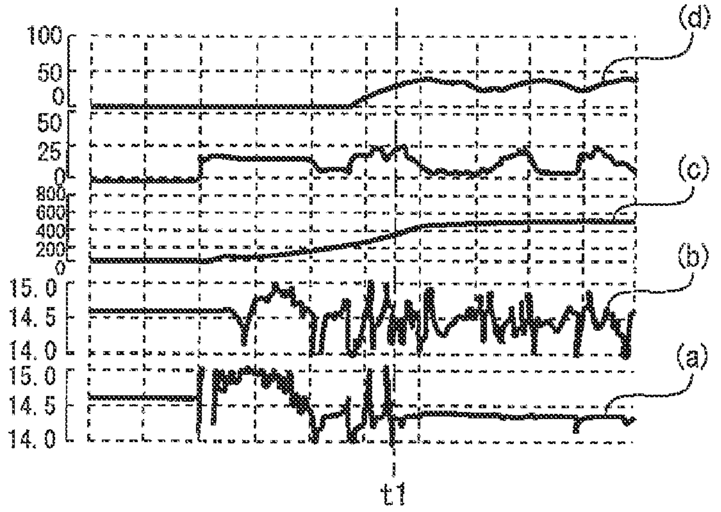
FIG. 2 is a view for describing changes in the operating state after start-up of the internal combustion engine, and changes in the air-fuel ratio based on the respective outputs of the air-fuel ratio sensors.
Figure 3:
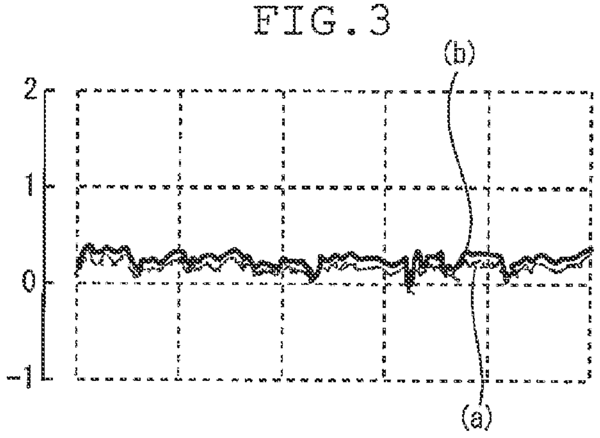
FIG. 3 is a view for describing the behavior of the respective limiting currents of the air-fuel ratio sensors when the catalyst is in an inactive state after start-up of the internal combustion engine.

FIG. 2 is a view for describing changes in the operating state after start-up of the internal combustion engine 2, and changes in the air-fuel ratio based on the respective outputs of the air-fuel ratio sensors 10 and 12. FIG. 3 is a view for describing the behavior of the respective limiting currents of the air-fuel ratio sensors 10 and 12 when the catalyst 6 is in an inactive state after start-up of the internal combustion engine 2. In FIG. 2, reference character (a) denotes a line representing an air-fuel ratio (second air-fuel ratio) that is detected based on the output of the Rr sensor 12, reference character (b) denotes a line representing an air-fuel ratio (first air-fuel ratio) that is detected based on the output of the Fr sensor 10, reference character (c) denotes a line representing the temperature of the catalyst 6, and reference character (d) denotes a line representing the vehicle speed. In FIG. 3, reference character (a) denotes a line representing the limiting current of the Rr sensor 12, and reference character (b) denotes a line representing the limiting current of the Fr sensor 10.

In FIG. 2, the catalyst 6 reaches an activation temperature at a time t1. After activation of the catalyst 6, the output of the Fr sensor 10 changes in accordance with the air-fuel ratio of exhaust gas before purification that has been emitted from the internal combustion engine 2. On the other hand, after activation of the catalyst 6, the detection object of the Rr sensor 12 is purified exhaust gas. Therefore, an air-fuel ratio that is based on the output of the Rr sensor 12 stably exhibits an almost constant value (a value in the vicinity of the theoretical air-fuel ratio).

In contrast, prior to the time t1, that is, when the catalyst 6 is in an inactive state, exhaust gas is not purified and unpurified exhaust gas also flows to the downstream side of the catalyst 6. That is, although there is a delay that corresponds to the capacity of the exhaust passage between the Fr sensor 10 and the Rr sensor 12, the same unpurified exhaust gas is the detection object of both the Fr sensor 10 and the Rr sensor 12.

Accordingly, if it is assumed that a deviation does not arise between a characteristic of the Fr sensor 10 and a characteristic of the Rr sensor 12, as shown in FIG. 3, it can be considered that the outputs of the Fr sensor 10 and the Rr sensor 12 will exhibit the same behavior when the catalyst 6 is inactive. Conversely, if a deviation arises between the output of the Fr sensor 10 and the output of the Rr sensor 12 when the catalyst 6 is inactive, it can be considered that the deviation is attributable to a deviation between the characteristics of the two sensors 10 and 12 and is not a deviation that is caused by a difference between the air-fuel ratios of the gas that is the object of detection.

Thus, at a time that the catalyst 6 is inactive after start-up of the internal combustion engine 2, the control apparatus 14 of the present embodiment detects an output (limiting current) of the Fr sensor 10 and an output of the Rr sensor 12 as respective characteristics thereof, and if there is a deviation between the two outputs, the control apparatus 14 calculates a correction coefficient that corrects the output of the Fr sensor 10. Thereafter, the output of the Fr sensor 10 is corrected using the correction coefficient until a new correction coefficient is set.

Figure 4:
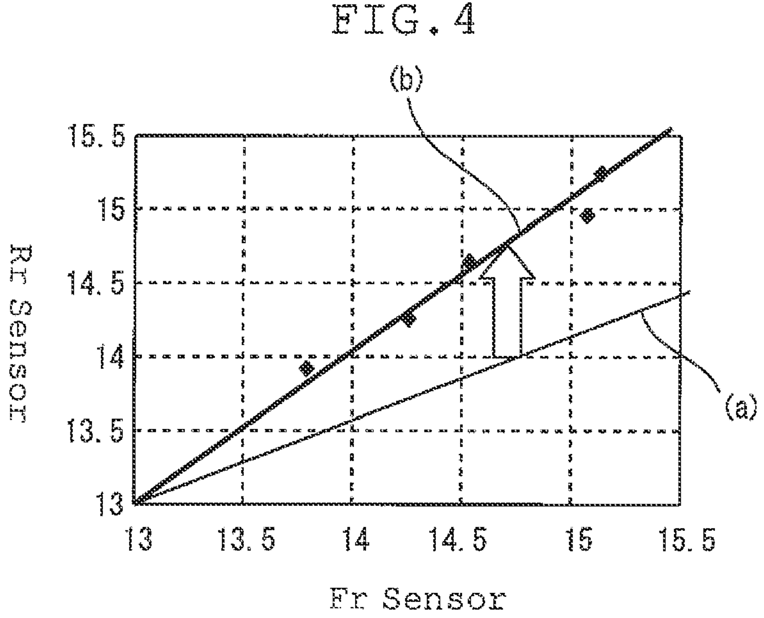
FIG. 4 is a view for describing the relationship between the outputs of the two sensors before and after correction in Embodiment 1 of the present invention.

FIG. 4 is a view for describing the relationship between the outputs of the two sensors 10 and 12 before and after correction in Embodiment 1 of the present invention. In FIG. 4, the horizontal axis represents an air-fuel ratio that is based on the output of the Fr sensor 10, and the vertical axis represents an air-fuel ratio that is based on the output of the Rr sensor 12. Further, in FIG. 4, reference character (a) denotes a line obtained by comparing air-fuel ratios that are based on the respective outputs of the two sensors 10 and 12 before correction, and reference character (b) denotes a line obtained by comparing air-fuel ratios that are based on the respective outputs of the two sensors 10 and 12 after correction.

In the example shown in FIG. 4, an air-fuel ratio calculated based on the output of the Fr sensor 10 inclines to the rich side relative to an air-fuel ratio calculated based on the output of the Rr sensor 12 (see straight line (a)). Therefore, in the control of the present embodiment, the Rr sensor 12 is taken as a standard, and the output characteristic of the Fr sensor 10 is corrected so as to match the output characteristic of the Rr sensor 12. That is, in this example, a correction coefficient that corrects the output of the Fr sensor 10 to an output on the lean side is set so that an air-fuel ratio that is based on the output of the Fr sensor 10 matches an air-fuel ratio that is based on the output of the Rr sensor 12 output (see straight line (b)).

More specifically, the limiting current of the Fr sensor 10 and the limiting current of the Rr sensor 12 are detected when the catalyst 6 is inactive, and a ratio (limiting current ratio) between a limiting current IL_Rr of the Rr sensor 12 and a limiting current IL_Fr of the Fr sensor 10 is determined as shown in the follow equation (1).

$$\text{Limiting current ratio}=IL\_Rr/IL\_Fr \quad (1)$$

While the catalyst 6 is inactive, detection of the limiting current ratio is repeatedly performed and samples are detected a plurality of times. After activation of the catalyst 6, a mean value of the detected limiting current ratios is calculated, and the mean value is set as a correction coefficient with respect to the output of the Fr sensor 10.

However, the limiting currents are compared while taking into account a delay that is equivalent to a time required to convey the exhaust gas that corresponds to the capacity of the exhaust passage 4 between the Fr sensor 10 and the Rr sensor 12 or the like. That is, values in a case where it is presumed that the Fr sensor 10 and the Rr sensor 12 detected the same exhaust gas are compared.

Further, although a limiting current changes in a 1:1 ratio with respect to an excess air factor (λ) and thus has a characteristic such that the limiting current increases as the excess air factor increases, the rate of change of the limiting current with respect to the excess air factor differs between a case where the air-fuel ratio is richer than the theoretical air-fuel ratio (λ=1) and a case where the air-fuel ratio is leaner than the theoretical air-fuel ratio. Therefore, correction coefficients for the Fr sensor 10 are calculated separately for a case where the air-fuel ratio is richer than the theoretical air-fuel ratio and a case where the air-fuel ratio is leaner than the theoretical air-fuel ratio. That is, the limiting current ratios are separated into limiting current ratios Kl that are ratios in the case of a lean atmosphere in which the limiting current IL_Rr of the Rr sensor 12 is greater than 0 and limiting current ratios Kr that are ratios in the case of a rich atmosphere in which the limiting current IL_Rr is less than or equal to 0, and correction coefficients (mean values) are calculated and set for the respective cases.

Further, variations within a tolerance range that are due to sensor initialization or deterioration over time are measured in advance, and based thereon a tolerance range of the limiting current ratio is set as a guard value Kmax. The limiting current ratios Kl and Kr are used for calculation of a correction coefficient only when the limiting current ratios Kl and Kr are smaller than Kmax, respectively.

Figure 5:
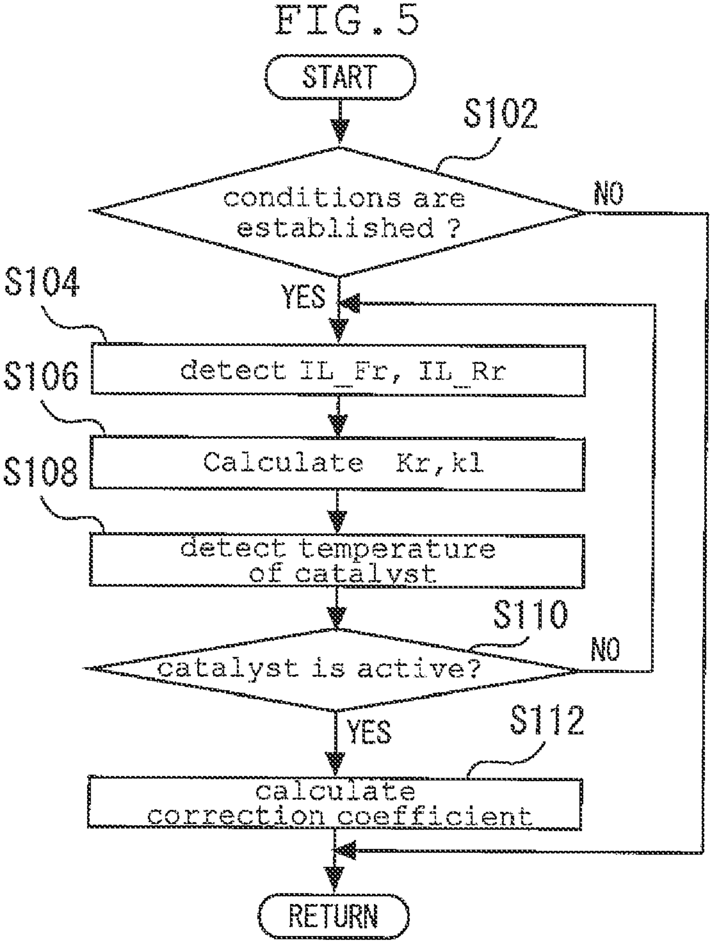
FIG. 5 is a flowchart for describing a control routine that the control apparatus executes in Embodiment 1 of the present invention.

FIG. 5 is a flowchart for describing a control routine that the control apparatus 14 executes in Embodiment 1 of the present invention. In the routine shown in FIG. 5, the control apparatus 14 first determines whether or not preconditions for calculating output correction coefficients of the air-fuel ratio sensors 10 and 12 are established (S102). Specific conditions include that there was an instruction to start the internal combustion engine 2, that the air-fuel ratio sensors 10 and 12 have not malfunctioned and are in an active state, and that an estimated temperature of the catalyst 6 is lower than a predetermined temperature, and such conditions are previously set and stored in the control apparatus 14.

Next, the limiting current IL_Fr of the Fr sensor 10 and the limiting current IL_Rr of the Rr sensor 12 are each detected (S104). As described above, in this case a delay that corresponds to the capacity of the exhaust passage between the Fr sensor 10 and the Rr sensor 12 is taken into account so that limiting currents with respect to the same exhaust gas are detected.

Next, a limiting current ratio for the air-fuel ratio sensors 10 and 12 is determined (S106). Specifically, a ratio between the limiting current IL_Rr of the Rr sensor 12 and the limiting current IL_Fr of the Fr sensor 10 is calculated according to the above described equation (1).

Next, the temperature of the catalyst 6 is detected (S108). The temperature of the catalyst 6, for example, can be detected in accordance with the output of a temperature sensor (not shown) that is arranged in the vicinity of the catalyst 6. Next, the control apparatus 14 determines whether or not catalytic activity is observed (S110). In this case, the control apparatus 14 makes the determination based on whether or not the temperature of the catalyst 6 is higher than the activation temperature. Note that the activation temperature is a value that is decided in accordance with the catalyst 6, and is previously stored in the control apparatus 14.

In step S110, if catalytic activity is not observed, the process returns to step S104 to detect the limiting current IL_Fr of the Fr sensor 10 and the limiting current IL_Rr of the Rr sensor 12 again, and the limiting current ratio is then calculated in step S106. Thereafter, the control apparatus 14 determines whether or not catalytic activity is observed in accordance with steps S108 to S110. The control apparatus 14 repeatedly executes the processing in steps S104 to S106 to detect the limiting current ratio and the processing in steps S108 to S110 to determine catalytic activity in this manner until catalytic activity is observed in step S110.

When catalytic activity is observed in step S110, the control apparatus 14 calculates a correction coefficient (S112). In this case, the limiting current ratios that have been determined in step S106 are separated into ratios in a case where IL_Rr>0 (lean case) and ratios in a case where IL_Rr≤0 (rich case), and mean values of the limiting current ratios are determined for the respective cases. The two mean values are set as correction coefficients. Note that in this calculation the correction coefficients are set in a manner such that a limiting current ratio that is greater than the guard value Kmax is not used. Thereafter, the current processing ends. The correction coefficients that have been set are used as correction coefficients that correct the output of the Fr sensor 10 until new correction coefficients are set.

As described above, according to Embodiment 1, correction coefficients for the output of the Fr sensor 10 are calculated when the catalyst 6 is inactive, that is, utilizing a timing at which the outputs of the air-fuel ratio sensors 10 and 12 that are at positions before and after the catalyst 6 should match. Accordingly, a difference between the output characteristics of the two air-fuel ratio sensors 10 and 12 can be corrected, and air-fuel ratio control and determination of catalyst deterioration can be executed with greater accuracy.

According to the present embodiment, a case has been described in which an output correction with respect to the Fr sensor 10 is calculated by taking the output of the Rr sensor 12 as a standard. The Fr sensor 10 is exposed to a high-concentration and high-temperature exhaust gas that is discharged from the internal combustion engine 2, and hence the Fr sensor 10 is significantly affected by poisoning and is liable to deteriorate. In contrast, because the detection object of the Rr sensor 12 is a low-concentration and low-temperature gas that has been purified at the catalyst 6, it is considered that the Rr sensor 12 is not prone to deterioration in comparison with the Fr sensor 10. Accordingly, by detecting correction coefficients by taking the output of the Rr sensor 12 as a standard, correction can be performed with greater accuracy.

However, the present invention is not limited to a configuration that takes the output of the Rr sensor 12 as a standard. For example, a configuration may be adopted that takes the output of the Fr sensor 10 as a standard, and in this case also a deviation between the output characteristics of the two air-fuel ratio sensors 10 and 12 can be corrected. Furthermore, a configuration can also be adopted in which, for example, differences or ratios between the limiting currents of the Fr sensor 10 and the Rr sensor are detected and mean values are determined, and thereafter the mean values are distributed and adopted as correction coefficients with respect to the Fr sensor 10 and the Rr sensor 12, respectively. The same applies with respect to the embodiments described hereunder also.

Furthermore, according to the present embodiment a case has been described in which the limiting current ratios are separated into ratios in a case where the limiting current $IL\_Rr>0$ and ratios in a case where the limiting current $IL\_Rr\leq 0$, and correction coefficients are detected for the respective cases. However, the present invention is not limited thereto, and a configuration may also be adopted that detects a limiting current ratio or a limiting current difference uniformly for all regions, and calculates correction coefficients uniformly. The same applies with respect to the embodiments described hereunder also.

In addition, according to the present embodiment a case has been described in which limiting currents are detected a plurality of times, and mean values of ratios between the limiting currents are adopted as correction coefficients. However, the present invention is not limited thereto. For example, a configuration may also be adopted in which limiting currents are detected once, and the limiting currents are used to calculate a correction coefficient. Furthermore, a correction coefficient is not limited to a ratio between limiting currents, and may be a variance between the limiting currents IL_Rr and IL_Fr or a value that is calculated in accordance with a difference (a variance or a ratio or the like) between the limiting currents IL_Rr and IL_Fr. The same applies with respect to the embodiments described hereunder also.

Embodiment 2

A system according to Embodiment 2 has the same configuration as the system shown in FIG. 1. When detecting limiting currents of the air-fuel ratio sensors 10 and 12 prior to catalytic activity in order to calculate correction coefficients, the control apparatus 14 of Embodiment 2 of the present invention performs the same control as in Embodiment 1 except that the control apparatus 14 of Embodiment 2 controls air-fuel ratios to become air-fuel ratios for correction coefficient calculation.

Specifically, according to the present embodiment, as air-fuel ratios for correction coefficient calculation (hereunder, referred to as "air-fuel ratios for correction"), a number of different air-fuel ratios are set in advance and stored in the control apparatus 14. More specifically, for example, air-fuel ratios for correction are taken to be within a range of 14.0 to 15.2 that is an actual usage range, and are selected and set so that the air-fuel ratios fluctuate significantly to the rich and lean sides within this range.

In the correction coefficient calculation, first, the air-fuel ratio is controlled by taking a rich air-fuel ratio that is one of the air-fuel ratios for correction as a target air-fuel ratio. A limiting current ratio Kr is detected with respect to this rich air-fuel ratio. Similarly, a limiting current ratio Kl or Kr is determined for each of the other lean and rich air-fuel ratios among the air-fuel ratios for correction. In this manner, a limiting current ratio Kl or Kr is determined for all of the air-fuel ratios for correction that are set. In addition, mean values are calculated for the limiting current ratios Kl and Kr, respectively, and the mean values are adopted as correction coefficients for the Fr sensor 10.

Figure 6:
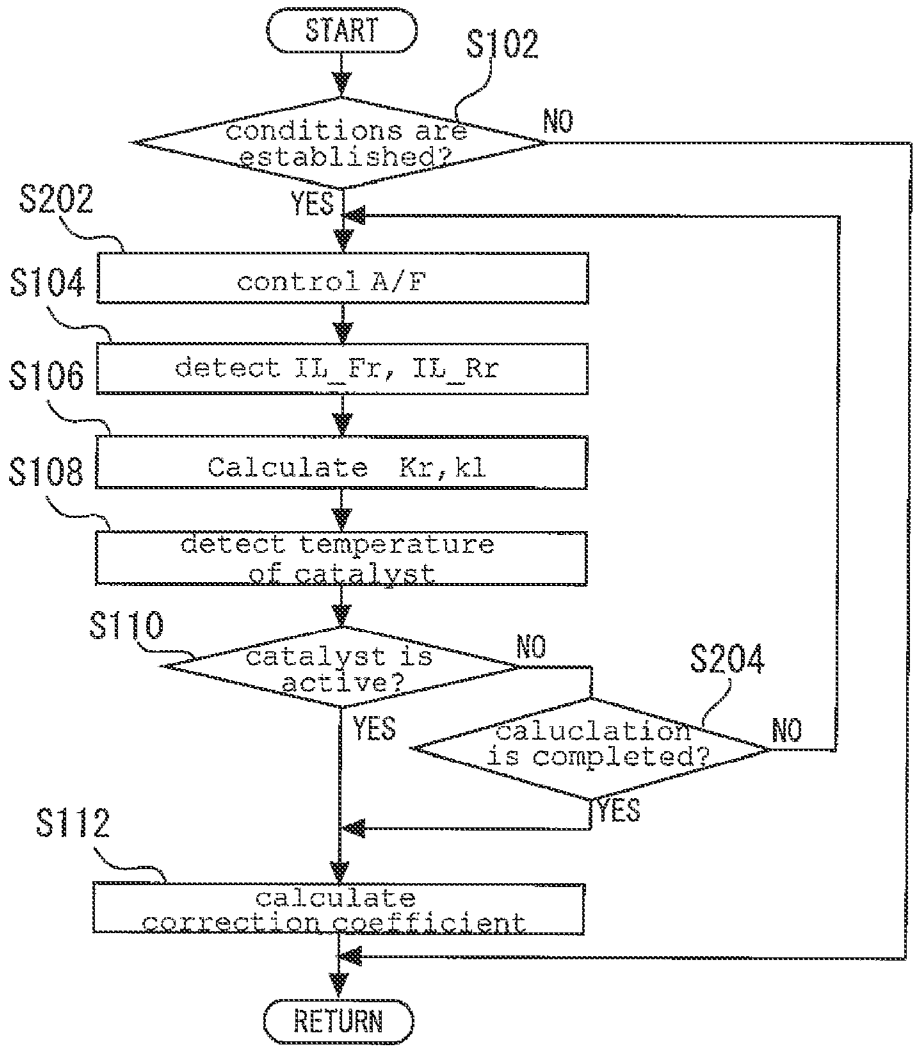
FIG. 6 is a flowchart for describing a control routine that the control apparatus 14 executes in Embodiment 2 of the present invention.

FIG. 6 is a flowchart for describing a control routine that the control apparatus 14 executes in Embodiment of the present invention. The routine illustrated in FIG. 6 is the same as the routine illustrated in FIG. 5 except that the routine in FIG. 6 includes processing in step S202 between steps S102 and S104, and processing in step S204 after step S110.

More specifically, after the control apparatus 14 determines that the preconditions are established in step S102, a target air-fuel ratio is set to an air-fuel ratio for which a limiting current ratio is undetected among the air-fuel ratios for correction, and air-fuel ratio control is executed (S202).

Next, the limiting current IL_Fr of the Fr sensor 10 and the limiting current IL_Rr of the Rr sensor 12 at the current air-fuel ratio are each detected (S104). Thereafter, the limiting current ratio Kr or Kl is calculated in accordance with the above described equation (1) (S106).

Thereafter, detection of the catalyst temperature and determination of catalytic activity is executed (S108 to S110), and if catalytic activity is not observed, the control apparatus 14 determines whether or not calculation of a limiting current ratio has been completed for all of the air-fuel ratios for correction that were previously set (S204). If the control apparatus 14 determines that calculation of limiting current ratios has not been completed, the processing returns to step S202 to set the target air-fuel ratio to another air-fuel ratio for which a limiting current ratio has not yet been detected among the air-fuel ratios for correction, and control of the air-fuel ratio is executed. In this state, detection of limiting currents and calculation of a limiting current ratio is executed (S104 to S106).

In contrast, if catalytic activity is determined in step S110 or if it is determined in step S204 that calculation of the limiting current ratios is completed, next, the control apparatus 14 calculates correction coefficients (S112). More specifically, the correction coefficients are separated into correction coefficients for the limiting current ratio Kr at which the air-fuel ratio is rich or for the limiting current ratio Kl at which the air-fuel ratio is controlled to a lean ratio, and are calculated as the respective mean values thereof. In this case also, the guard value Kmax is set for the limiting current ratios, and a limiting current ratio that is larger than the guard value is not used for calculation of the correction coefficients.

As described above, when calculating correction coefficients according to the present embodiment 2, the air-fuel ratios are controlled to so as to fluctuate to a large degree within a range from rich to lean. It is thereby possible to calculate more appropriate correction coefficients by using values in a case where large differences appear in the behavior of the two air-fuel ratio sensors, namely, the Fr sensor 10 and the Rr sensor 12.

Note that, although in the present embodiment 2 a case has been described in which the air-fuel ratios for correction are taken as a plurality of air-fuel ratios within a range of 14.0 to 15.2, the setting range of the air-fuel ratios for correction in the present invention is not limited thereto. However, it is desirable that the air-fuel ratios fluctuate as much as possible to a large degree so that differences in the limiting currents appear in a noticeable manner, and that the air-fuel ratio changes are within an actual usage range. Accordingly, it is desirable to set the plurality of air-fuel ratios for correction so that the air-fuel ratios fluctuate as much as possible to a large degree within a range of air-fuel ratios from 14.1 to 15.1 or from 14.0 to 15.2.

Embodiment 3

A system according to Embodiment 3 has the same configuration as the system shown in FIG. 1. Although in Embodiments 1 and 2 correction coefficients were calculated with respect to an output (limiting current) as a characteristic of the air-fuel ratio sensors 10 and 12, the system according to Embodiment 3 performs control that is different to Embodiments 1 and 2 in the respect that correction values are calculated with respect to responsiveness as a characteristic of the two sensors 10 and 12.

Figure 7:
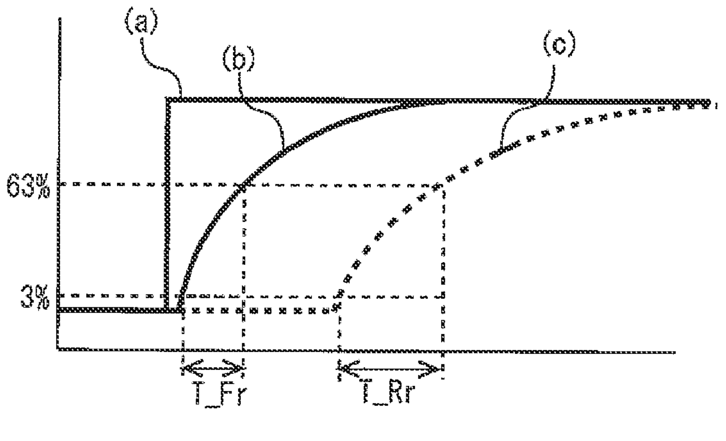
FIG. 7 illustrates changes in air-fuel ratios that are based on the outputs of the sensors in a case where the air-fuel ratios are caused to change.

FIG. 7 illustrates changes in air-fuel ratios that are based on the outputs of the two sensors 10 and 12 in a case where the air-fuel ratios are caused to change to a large degree in a step shape. In FIG. 7, reference character (a) denotes a line that represents an actual air-fuel ratio that was caused to change, reference character (b) denotes a line that represents an air-fuel ratio that is based on the output of the Fr sensor 10, and reference character (c) denotes a dashed line that represents an air-fuel ratio that is based on the output of the Rr sensor 12.

As shown in FIG. 7, when control is performed so as to cause the air-fuel ratio to change by a large amount, the exhaust gas first arrives at the Fr sensor 10, and as shown by line (b), the air-fuel ratio that is based on the Fr sensor 10 begins to change in the manner shown in the drawing, and gradually increases until eventually the Fr sensor 10 emits an output that corresponds to the actual air-fuel ratio. On the other hand, the exhaust gas arrives at the Rr sensor 12 after a delay that corresponds to the capacity of the exhaust passage 4 and the like. Thereafter, as shown by dashed line (c), the output of the Rr sensor 12 begins to change and gradually increases until eventually the Rr sensor 12 emits an output that corresponds to the actual air-fuel ratio.

In this case, if a deviation arises between the responsiveness of the Fr sensor 10 and the responsiveness of the Rr sensor 12, it is considered that the deviation arises during a time period from when the output of the Fr sensor 10 begins to change in accordance with the air-fuel ratio until the Fr sensor 10 emits an output that is in accordance with the actual air-fuel ratio, and a time period from when the output of the Rr sensor 12 begins to change until the Rr sensor 12 emits an output that is in accordance with the actual air-fuel ratio.

Therefore, according to the present embodiment 3, for each of the Fr sensor 10 and the Rr sensor 12, a time period from when the output thereof becomes an output that corresponds to 3% of the actual air-fuel ratio until the output becomes an output that corresponds to 63% of the actual air-fuel ratio is detected as a response time T_Fr and a response time T_Rr, respectively. Thereafter, a ratio between the response time T_Fr of the Fr sensor 10 and the response time T_Rr of the Rr sensor 12 is detected, and correction values for the relevant response time are calculated.

Note that, in the present embodiment 3, the air-fuel ratio is caused to undergo a step-like change in the case of a change from a rich to a lean ratio and in the case of a change from a lean to a rich ratio, respectively, within an air-fuel ratio range of 14.1 to 15.1 or 14.0 to 15.2, and a correction value is determined for each case.

Figure 8:
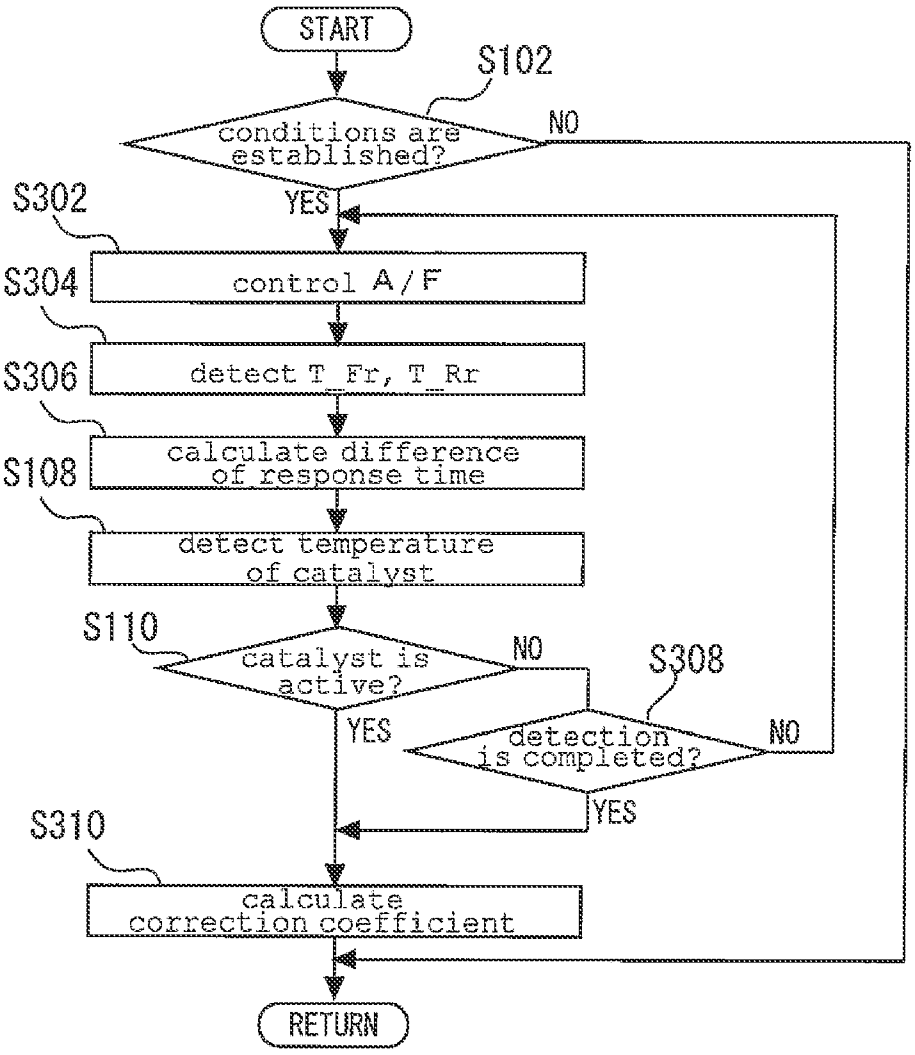
FIG. 8 is a view for describing a control routine that the control apparatus executes in Embodiment 3 of the present invention.

FIG. 8 is a view for describing a control routine that the control apparatus 14 executes in Embodiment 3 of the present invention. In the routine shown in FIG. 8, first, after the control apparatus 14 determines that the preconditions are established in step S102, the air-fuel ratio is controlled to become a predetermined rich or lean air-fuel ratio so that the air-fuel ratio rapidly changes in a step shape (S302).

Next, the response time T_Fr of the Fr sensor 10 and the response time T_Rr of the Rr sensor 12 are detected (S304). More specifically, for each of the Fr sensor 10 and the Rr sensor 12, a time period from a time that an output signal that corresponds to 3% of the actual air-fuel ratio is emitted until a time that an output signal that corresponds to 63% of the actual air-fuel ratio is emitted is detected as the response time thereof, respectively.

Next, a difference between the response time T_Fr of the Fr sensor 10 and the response time T_Rr of the Rr sensor 12 is calculated (S306).

Subsequently, the temperature of the catalyst 6 is detected (S108), and the control apparatus 14 determines whether or not catalytic activity is observed (S110). If catalytic activity is not observed, the control apparatus 14 next determines whether or not detection of a response time is completed for each of the rich air-fuel ratios and lean air-fuel ratios that have been set (S308). If the control apparatus 14 determines that detection of response times is not completed, the process returns to step S302 to set the next target air-fuel ratio and control the air-fuel ratio again so as to change in a step shape. Thereafter, detection of response times with respect to the step-like change (S304), and calculation of a difference between the response times (S306) is executed.

In contrast, if catalytic activity is observed in S110 or if it is determined in S308 that detection has been completed, next, the control apparatus 14 executes correction with correction values that relate to the responsiveness. More specifically, a mean value is calculated for the differences between the response times of the two sensors 10 and 12 when the air-fuel ratio was changed to a rich side, and the differences between the response times when the air-fuel ratios was changed to a lean side, respectively. The mean values are used as correction values for the responsiveness of the Fr sensor 10.

As described above, according to the present embodiment 3, in a case where a deviation arises between the responsiveness of the Fr sensor 10 and the responsiveness of the Rr sensor 12, the deviation can be corrected. It is thereby possible to cause the responsiveness, which is a characteristic of the respective air-fuel ratio sensors, to be the same for the two sensors. Consequently, control such as control to determine catalyst deterioration can be performed with higher accuracy.

In the present embodiment 3 also, a case has been described in which correction values for the responsiveness of the Fr sensor 10 are calculated by adopting the Rr sensor 12 as a standard. However, similarly to Embodiments 1 and 2, a configuration can also be adopted in which, conversely, the Fr sensor 10 is adopted as a standard, or the determined correction values are distributed and the responsiveness of both the Fr sensor 10 and the Rr sensor 12 is corrected.

In addition, in the present embodiment 3 a case has been described in which time periods from when the respective outputs of the sensors 10 and 12 exhibit a change of 3% until completing a change of 63% relative to the actual air-fuel ratio are detected as response times. However, in the present invention a range that is set with respect to the response times is not limited thereto. For example, a configuration can also be adopted which takes a time at which the respective outputs exhibit a change of 5% or 10% as the start of the response time range and takes another value instead of 63% as the upper limit of the response time range, and this range can be set as appropriate.

Further, the present invention is not limited to a configuration that takes a time period of changes in a certain range as a response time in this manner. For example, a configuration may be adopted in which a time period from when the air-fuel ratio is changed until the respective outputs of the sensors 10 and 12 exhibit values that correspond to the air-fuel ratio may also be used as a response time. However, in this case, with regard to the response time of the Rr sensor 12, it is necessary to perform the calculation by excluding the amount of time required for gas to be conveyed from the Fr sensor 10 to the Rr sensor 12.

Embodiment 4

A system according to Embodiment 4 has the same configuration as the system shown in FIG. 1. The system according to Embodiment 4 performs the same control as that of the system according to Embodiment 1 except that in addition to determining correction coefficients for the limiting currents of the Fr sensor 10 and the Rr sensor 12, correction values for correcting the responsiveness of the two sensors 10 and 12 are detected in accordance with the limiting currents.

Figure 9:
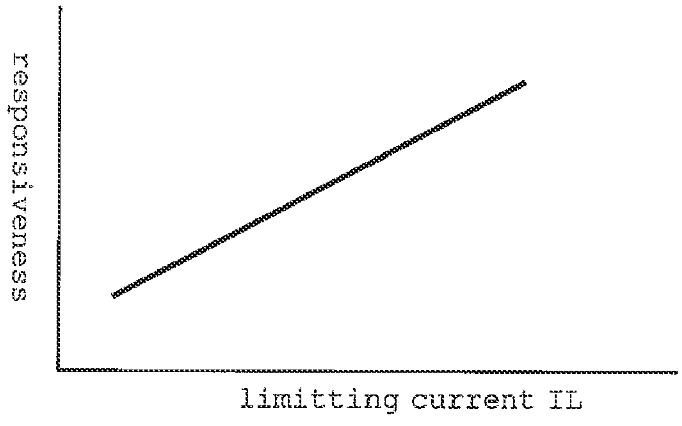
FIG. 9 is a view for describing the relationship between the limiting current and responsiveness of the air-fuel ratio sensors.

FIG. 9 is a view for describing the relationship between the limiting current and responsiveness of the air-fuel ratio sensors, in which the horizontal axis represents a limiting current and the vertical axis represents responsiveness. Further, in FIG. 9, the limiting current IL is a limiting current with respect to an air-fuel ratio (fixed value) of around 14 to 15, and the responsiveness is, in a case where an air-fuel ratio is caused to change to the aforementioned air-fuel ratio (fixed value), a time period until a change of 3% of the air-fuel ratio starts.

As shown in FIG. 9, at an air-fuel ratio that is within an actual usage range of around 14 to 15, a limiting current output characteristic and a responsiveness characteristic have a 1:1 correlation, and thus the more that the limiting current of the sensor tends to increase (exhibit an output on a lean side), the more that the responsiveness of the sensor also tends to increase.

Therefore, in the present embodiment 4 this property is utilized to calculate correction values relating to responsiveness in accordance with the correction coefficients determined according to Embodiment 1. The relationship between correction coefficients for limiting currents and correction values for responsiveness is previously determined by experimentation or the like, and is stored as a map in the control apparatus 14. In the actual control, the control apparatus 14 sets a correction value for responsiveness in accordance with a correction coefficient for a limiting current according to the map.

Figure 10:
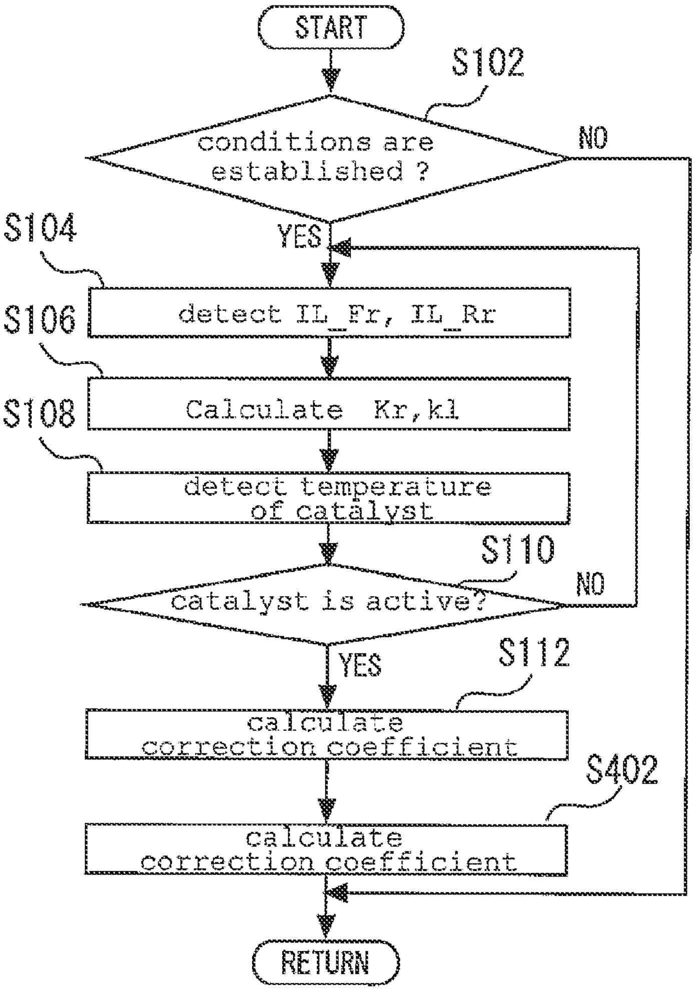
FIG. 10 is a flowchart for describing a control routine that the control apparatus executes in Embodiment 4 of the present invention.

FIG. 10 is a flowchart for describing a control routine that the control apparatus 14 executes in this embodiment of the present invention. The routine in FIG. 10 is the same as the routine in FIG. 4, except that the routine in FIG. 10 includes step S402 after step S112.

In the routine shown in FIG. 10, as described in Embodiment 1, when calculation of correction coefficients for the limiting current of the Fr sensor 10 is completed, next the control apparatus 14 calculates respective correction values relating to the responsiveness of the Fr sensor 10 in accordance with the respective correction coefficients (S402). The relationship between correction values for responsiveness and correction coefficients for a limiting current are previously prescribed as a map and stored in the control apparatus 14. In this case, the correction values relating to responsiveness are determined in accordance with the map.

As described above, according to the present embodiment 4, correction values for the responsiveness of the Fr sensor can be calculated more simply by utilizing correction coefficients for the limiting current. Accordingly, a plurality of characteristics of the two sensors 10 and 12 can be combined and the accuracy of failure detection of the catalyst 6 and the like can be increased with ease.

Note that in the present embodiment 4 also a case has been described in which correction values for the output and responsiveness of the Fr sensor 10 are calculated by adopting the output of the Rr sensor 12 as a standard. However, as described above, a configuration may also be adopted in which the output and responsiveness of the Rr sensor 12 is corrected by adopting the output of the Fr sensor 10 as a standard, or in which the output and responsiveness of both the sensor 10 and the sensor 12 are corrected.

Further, in the present embodiment 4 a case has been described in which correction coefficients relating to responsiveness are calculated in accordance with output correction coefficients of the Fr sensor 10. However, the present invention is not limited to a configuration in which a correction coefficient relating to responsiveness is calculated in accordance with an output correction coefficient. As described above, there is a correlation between the responsiveness and the limiting current IL. Accordingly, it is sufficient that a correction coefficient relating to responsiveness is calculated in accordance with a difference between the output of the Fr sensor 10 and the output of the Rr sensor 12.

Embodiment 5

Figure 11:
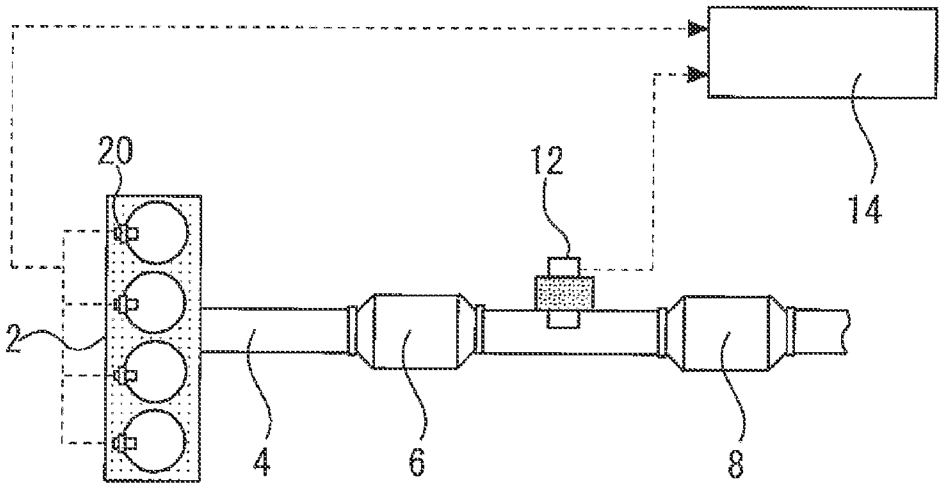
FIG. 11 is a schematic diagram for describing the overall configuration of a system according to Embodiment 5 of the present invention.

FIG. 11 is a schematic diagram for describing the overall configuration of a system according to Embodiment 5 of the present invention. The system according to Embodiment 5 has the same configuration as the system shown in FIG. 1 except that the system according to Embodiment 5 does not have the Fr sensor 10 on the upstream side of the catalyst 6 and includes in-cylinder pressure sensor 20.

More specifically, the internal combustion engine 2 includes a plurality of cylinders, and an in-cylinder pressure sensor (first sensor) 20 is provided in each cylinder. The in-cylinder pressure sensors 20 are sensors that emit an output according to a pressure. Each in-cylinder pressure sensor 20 is connected to the control apparatus 14. The control apparatus 14 receives an output signal from each of the in-cylinder pressure sensors 20, and can detect a combustion pressure inside a combustion chamber of each cylinder.

In Embodiment 5, at the control apparatus 14, a heating value is calculated in accordance with the determined combustion pressures, and a fuel consumption rate is calculated in accordance with the heating value. In addition, air-fuel ratios are calculated based on an intake air amount and the fuel consumption rate. In the embodiments described hereunder, an air-fuel ratio that is calculated based on the output of the in-cylinder pressure sensors 20 may also be referred to as a "CPS air-fuel ratio", and an air-fuel ratio that is calculated based on the output of the Rr sensor 12 may also be referred to as an "AFS air-fuel ratio".

Figure 12:
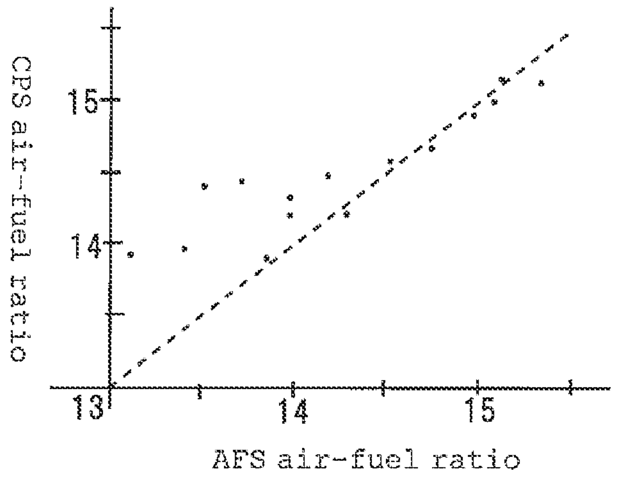
FIG. 12 is a view for describing the difference between air-fuel ratios based on the output of the in-cylinder pressure sensor and the output of the air-fuel ratio sensor, and the correction thereof in Embodiment 5 of the present invention.

FIG. 12 is a view for describing the relationship between air-fuel ratios based on the output of the two sensors 20 and 12 before and after correction in Embodiment 5 of the present invention. In FIG. 12, the horizontal axis represents the AFS air-fuel ratio and the vertical axis represents the CPS air-fuel ratio. Further, in FIG. 12, the dashed line shows the relationship between the AFS air-fuel ratio and the CPS air-fuel ratio after correction, and the plot shows the relationship between the AFS air-fuel ratio and the CPS air-fuel ratio that is based on actual measured values.

As shown in FIG. 12, because calculation coefficients are determined according to the suitability thereof, there are large variations in the CPS air-fuel ratio that depend on the operating state of the internal combustion engine 2, fuel properties, changes over time and the like. Therefore, according to the present embodiment 5, correction coefficients are calculated so that the CPS air-fuel ratio (or a parameter for calculating the CPS air-fuel ratio) matches the AFS air-fuel ratio.

More specifically, a correction coefficient is determined by the following equation (2), and is taken as a ratio between the CPS air-fuel ratio and the APS air-fuel ratio.

Ratio of air-fuel ratios=CPS air-fuel ratio/AFS air-fuel ratio (2)

The ratio of air-fuel ratios is calculated by a similar method as that used for calculation of the limiting current ratio in Embodiment 1. That is, while the catalyst 6 is inactive, detection of the air-fuel ratio is repeated and a plurality of samples are detected. After activation of the catalyst 6, a mean value of the ratios of air-fuel ratios is calculated, and the mean value is set as a correction coefficient for the Fr sensor 10. However, the CPS air-fuel ratio and the AFS air-fuel ratio are compared while taking into account a delay that corresponds to the capacity of the exhaust passage 4 between the in-cylinder pressure sensors 20 and the Rr sensor 12 and the like. That is, values in a case where it is presumed that the in-cylinder pressure sensors 20 and the Rr sensor 12 detected the same exhaust gas are compared.

Further, with regard to correction coefficients for the in-cylinder pressure sensors 20 also, correction coefficients are calculated separately for a case where the air-fuel ratio is richer than the theoretical air-fuel ratio and a case where the air-fuel ratio is leaner than the theoretical air-fuel ratio. That is, the correction coefficients are separated into correction coefficients for a case of a lean atmosphere in which the limiting current IL_Rr of the Rr sensor 12 is greater than 0 and correction coefficients for a case of a rich atmosphere in which the limiting current IL_Rr is less than or equal to 0, and correction coefficients (mean values) are calculated and set for the respective cases.

Further, a CPS air-fuel ratio calculation value that is based on the CPS air-fuel ratio output is influenced by the intake air amount and the number of engine revolutions. Accordingly, when calculating a correction coefficient, the intake air amounts are divided into three regions GA1, GA2, and GA3 and the numbers of engine revolutions are divided into three regions NE1, NE2, and NE3 to obtain a total of nine regions, and correction coefficients K1 to K9 are calculated for the respective regions. As described above, correction coefficients in Embodiment 5 are stored in the control apparatus as a map in which the relationship between an intake air amount and a number of engine revolutions is prescribed with respect to a case where the AFS air-fuel ratio is rich and a case where the AFS air-fuel ratio is lean, respectively.

Note that, similarly to Embodiment 1, variations that are due to sensor initialization or deterioration over time are measured in advance, and based thereon a limit value for the ratio of air-fuel ratios is set as a guard value. When calculating the correction coefficients, a ratio of air-fuel ratios that exceeds the limit value is excluded from the calculation.

Figure 13:
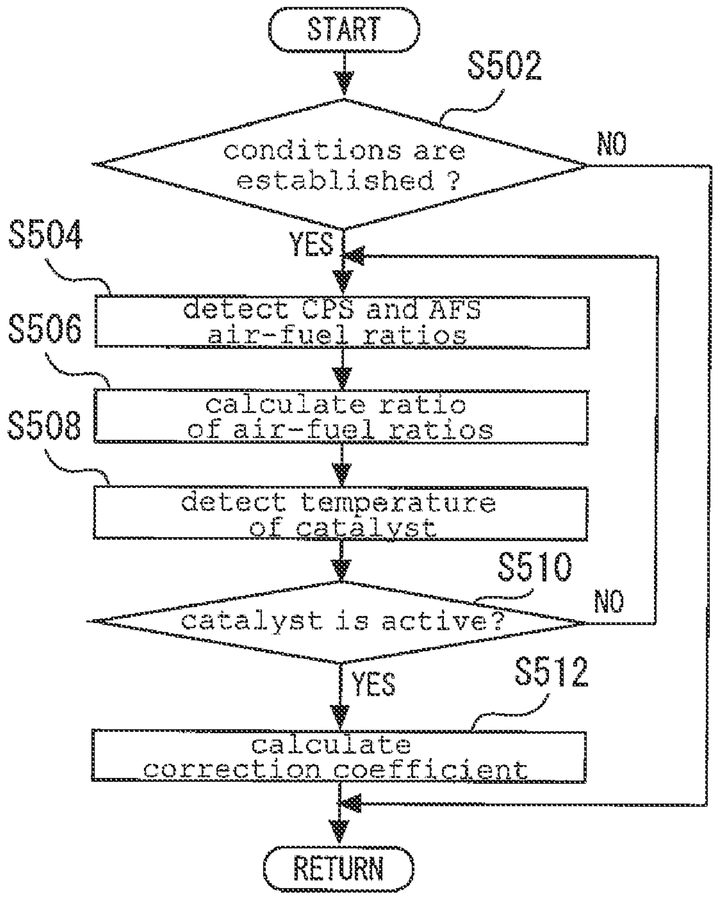
FIG. 13 is a flowchart for describing a control routine that the control apparatus executes in Embodiment 5 of the present invention.

FIG. 13 is a flowchart for describing a control routine that the control apparatus 14 executes in Embodiment 5 of the present invention. In the routine shown in FIG. 13, first, the control apparatus 14 determines whether or not preconditions for calculating correction coefficients for the in-cylinder pressure sensors 20 are established (S502). Specific conditions include that there was a instruction to start the internal combustion engine 2, that the in-cylinder pressure sensors 20 and the air-fuel ratio sensor 12 have not malfunctioned and are in an active state, and that an estimated temperature of the catalyst 6 is lower than a predetermined temperature, and such conditions are previously set and stored in the control apparatus 14.

Next, the CPS air-fuel ratio and the AFS air-fuel ratio are each detected (S504). In this case, the CPS air-fuel ratio is determined based on the output of the in-cylinder pressure sensors 20 in accordance with a computing equation that is stored in the control apparatus. Similarly, the AFS air-fuel ratio is detected in accordance with a limiting current that is the output of the Rr sensor 12. Note that, as described above, in this case a delay that corresponds to the capacity between the in-cylinder pressure sensors 20 and the Rr sensor 12 is taken into account so that air-fuel ratios with respect to the same exhaust gas are calculated.

Subsequently, the ratio between the CPS air-fuel ratio and the AFS air-fuel ratio is determined (S506). Next, the temperature of the catalyst 6 is detected (S508). Thereafter, the control apparatus 14 determines whether or not catalytic activity is observed (S510).

If catalytic activity is not observed in step S510, the processing returns to step S504 to again determine the CPS air-fuel ratio and the AFS air-fuel ratio, and the ratio between the CPS air-fuel ratio and the AFS air-fuel ratio is then determined in step S506. Thereafter, a determination as to whether or not catalytic activity is observed is executed in accordance with steps S508 to S510. The processing of steps S504 to S510 is repeatedly executed in this manner until catalytic activity is observed in step S510.

When catalytic activity is observed in step S510, the control apparatus then calculates the correction coefficients (S512). Here, the ratios of air-fuel ratios determined in step S506 are separated into ratios for a case where IL_Rr>0 (lean case) and for a case where IL_Rr≤0 (rich case), and furthermore are separated into the respective regions for the number of engine revolutions and the intake air amount that are described above. A mean value of the ratios of air-fuel ratios is determined for each region. The resulting mean values are set as correction coefficients for the respective regions. Note that this calculation is performed in a manner such that a ratio of air-fuel ratios that is greater than the limit value that is the guard value is not used for the calculation. Thereafter, the current processing ends. The correction coefficients that are set in this manner are used as correction coefficients that correct the CPS air-fuel ratio until new correction coefficients are set.

As described above, according to the present embodiment 5, when in-cylinder pressure sensors are utilized without installing an air-fuel ratio sensor upstream of the catalyst 6 also, a CPS air-fuel ratio can be calculated based on the in-cylinder pressure sensors 20. Thus, it is also possible to ensure a high level of accuracy with respect to air-fuel ratio control for the system that detects an air-fuel ratio based on the output of the in-cylinder pressure sensors 20.

In Embodiment 5, a case has been described in which the AFS air-fuel ratios are separated according to rich cases and lean cases, and furthermore the number of engine revolutions and the intake air amount are each divided into three regions, and correction coefficients are set for the respective regions. However, a correction coefficient is not limited to the correction coefficients that are set for respective regions in this manner, and only a single correction coefficient may be determined and used as a correction coefficient for the CPS air-fuel ratio. Further, a case has been described in which the intake air amount and number of engine revolutions that influence the calculation of a CPS air-fuel ratio are each divided into three regions. However, in the present invention the parameters for which regions are set in this manner are not limited to the intake air amount and the number of engine revolutions, and another parameter that influences the calculation of the CPS air-fuel ratio may also be used. Further, the number of regions into which the aforementioned parameters are divided is not limited to three. The same also applies with respect to the embodiments described hereunder.

Furthermore, in the present embodiment 5, a case has been described in which air-fuel ratios are detected a plurality of times, and a mean value of the ratios of the air-fuel ratios is taken as a correction coefficient. However, the present invention is not limited thereto. For example, a configuration may also be adopted in which detection of the air-fuel ratio is performed once, and the detected air-fuel ratio is used to calculated a correction coefficient. In addition, a correction coefficient is not limited to a value that is calculated in accordance with a ratio of air-fuel ratios, and may be a value that is calculated in accordance with a variance between a CPS air-fuel ratio and an AFS air-fuel ratio, or in addition, may be a value that is calculated in accordance with a difference (a variance or a ratio or the like) between a CPS air-fuel ratio and an AFS air-fuel ratio. The same also applies with respect to the embodiments described hereunder.

Embodiment 6

A system according to Embodiment 6 has the same configuration as the system shown in FIG. 11. When detecting a CPS air-fuel ratio and an AFS air-fuel ratio before activation of the catalyst 6 in order to calculate correction coefficients, the control apparatus 14 of Embodiment 6 of the present invention performs the same control as in Embodiment 5 except that the control apparatus 14 of Embodiment 6 controls air-fuel ratios to be air-fuel ratios for correction that are used for calculating correction coefficients.

More specifically, similarly to Embodiment 2, in the present embodiment 6 a number of different air-fuel ratios for correction are set in advance so as to fluctuate to a large degree to a rich side and a lean side within a range of 14.0 to 15.2, and are stored in the control apparatus 14.

In the correction coefficient calculation, first, the air-fuel ratio is controlled by taking one rich air-fuel ratio among the air-fuel ratios for correction as a target air-fuel ratio. A ratio of air-fuel ratios is detected at the rich air-fuel ratio. Similarly, a ratio of air-fuel ratios is determined for each of the other lean and rich air-fuel ratios among the air-fuel ratios for correction. Thus, ratios of air-fuel ratios are determined for all of the air-fuel ratios for correction that are set. In addition, mean values of each of the ratios of air-fuel ratios are calculated for each of the regions of the intake air amount and the number of engine revolutions that are described in Embodiment 5 and are also calculated for the rich and lean air-fuel ratios, respectively, and the calculated mean values are adopted as correction coefficients for calculation of the CPS air-fuel ratio.

Figure 14:
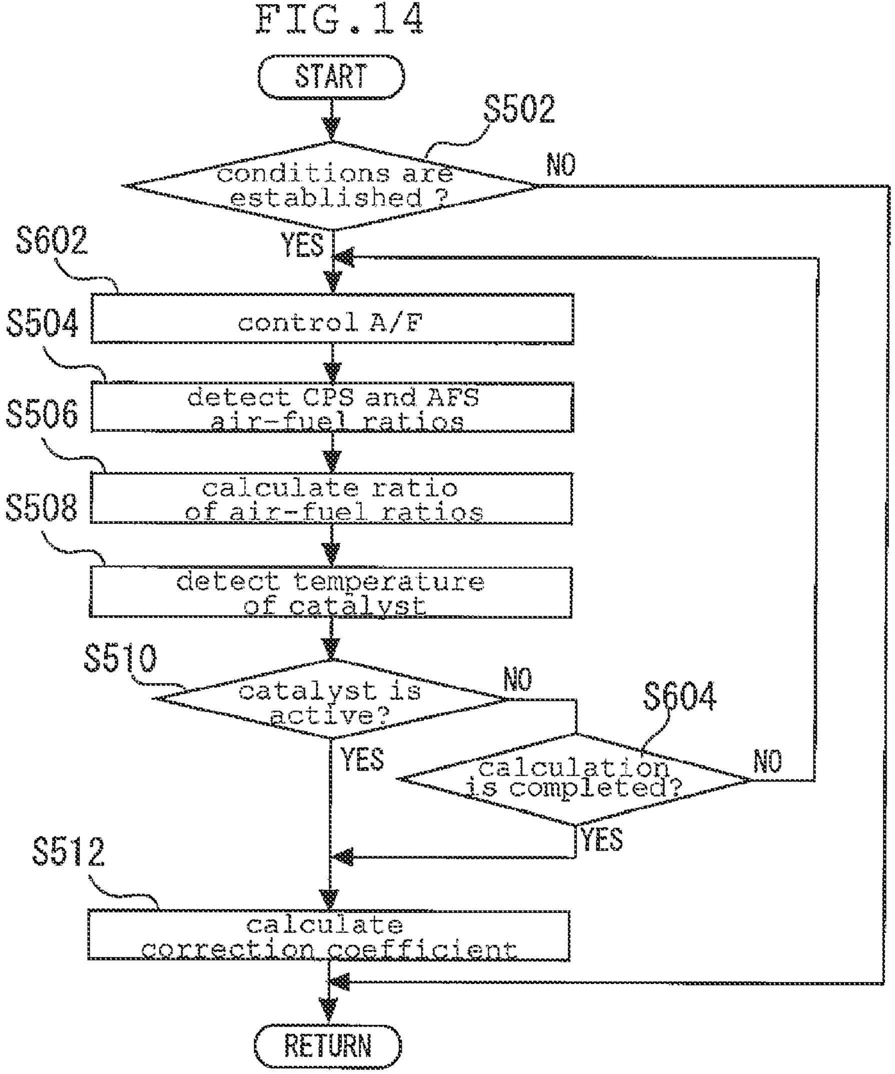
FIG. 14 is a flowchart for describing a control routine that the control apparatus executes in Embodiment 6 of the present invention.

FIG. 14 is a flowchart for describing a control routine that the control apparatus 14 executes in Embodiment of the present invention. The routine illustrated in FIG. 14 is the same as the routine illustrated in FIG. 13 except that the routine in FIG. 14 includes processing in step S602 between steps S502 and S504, and processing in step S604 after step S510.

Specifically, after the control apparatus 14 determines that the preconditions are established in step S502, a target air-fuel ratio is set to an air-fuel ratio for which a ratio of air-fuel ratios is undetected among the air-fuel ratios for correction, and air-fuel ratio control is executed (S602).

Next, a CPS air-fuel ratio and an AFS air-fuel ratio are detected at the current air-fuel ratio (S504), and a ratio between the CPS air-fuel ratio and AFS air-fuel ratio is calculated (S506). Thereafter, detection of the catalyst temperature and determination of catalytic activity is executed (S508 to S510), and if catalytic activity is not observed, the control apparatus 14 determines whether or not calculation of a ratio of air-fuel ratios has been completed for all of the air-fuel ratios for correction that were previously set (S604). If the control apparatus 14 determines that calculation of the ratios of air-fuel ratios has not been completed, the processing returns to step S602 to set the target air-fuel ratio to another air-fuel ratio for which a ratio of air-fuel ratios has not yet been detected among the air-fuel ratios for correction, and control of the air-fuel ratio is executed. In this state, the processing in steps S504 to S506 is executed.

In contrast, if catalytic activity is determined in step S510 or if it is determined in step S604 that calculation of the ratios of air-fuel ratios is completed, next, the control apparatus 14 calculates correction coefficients (S512). More specifically, the correction coefficients are calculated for each region and by separating the air-fuel ratios into air-fuel ratios in a rich case and air-fuel ratios in a lean case. In this case also, a limit value is set, and an air-fuel ratio that is larger than the guard value is not used for calculation of the correction coefficients.

As described above, when calculating correction coefficients according to the present embodiment 6, air-fuel ratios are controlled so as to fluctuate to a large degree within a range from rich to lean. It is thereby possible to calculate correction coefficients more accurately using values in a case where large differences appear in the behavior of the in-cylinder pressure sensors 20 and the air-fuel ratio sensor 12.

Note that, although in the present embodiment 6 a case has been described in which the air-fuel ratios for correction are taken as a plurality of air-fuel ratios within a range of 14.0 to 15.2, a setting range of the air-fuel ratios for correction in the present invention is not limited thereto. The description regarding the setting range of the air-fuel ratios for correction in Embodiment 2 similarly applies to the setting range of the air-fuel ratios for correction in the present embodiment.

Figure 15:
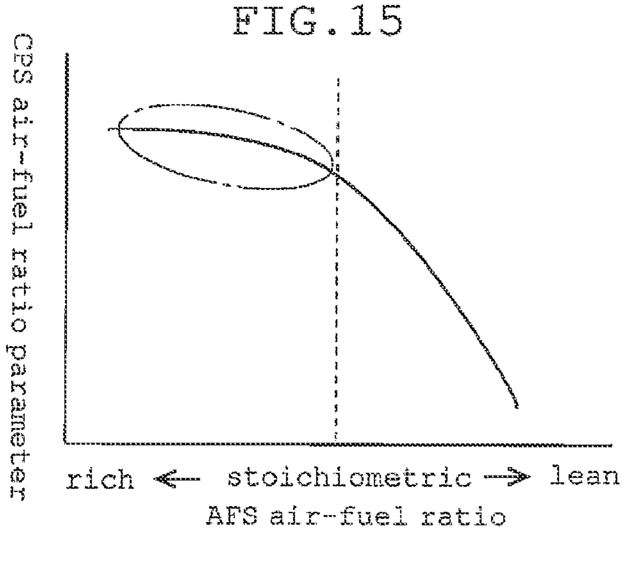
FIG. 15 is a view that shows a region in which the air-fuel ratios for correction is set in other example of Embodiment 6 of the present invention.

In addition, setting of regions into which to separate the air-fuel ratios for correction is not limited to general regions on the lean side and the rich side, and a configuration may be adopted in which a certain region in which, in particular, the CPS air-fuel ratio should be corrected is set, and in which correction that centers on that region is performed. FIG. 15 is a view that shows a region in which variations are liable to arise in the CPS air-fuel ratio in Embodiment 6 of the present invention.

As described above, in the CPS air-fuel ratio calculation that is based on the in-cylinder pressure sensors 20, a fuel consumption rate is calculated using a heating value that is determined based on a combustion pressure. Consequently, when there is excess fuel (a rich air-fuel ratio), the sensitivity decreases and the detection accuracy of the CPS air-fuel ratio is liable to decrease (see the region indicated by the alternate long and short dash line in FIG. 15). Accordingly, a range of the air-fuel ratios for correction is set on the rich side so that detection is performed that detects many samples on the rich side. Further, a configuration may be adopted so as mainly calculate correction coefficients for a region in which the air-fuel ratios are on the rich side.

In addition, a region in which correction coefficients are mainly calculated in this manner is not necessarily limited to the rich side. For example, a configuration may be adopted in which an operating condition of the internal combustion engine that influences calculation of a CPS air-fuel ratio is specified, and when a CPS air-fuel ratio and an AFS air-fuel ratio are compared for each region of the operating condition, a region in which a difference between the CPS air-fuel ratio and the AFS air-fuel ratio increases to exceed a tolerance range is identified, and correction coefficients are mainly calculated with respect to the relevant operating conditions in that region.

Embodiment 7

Figure 16:
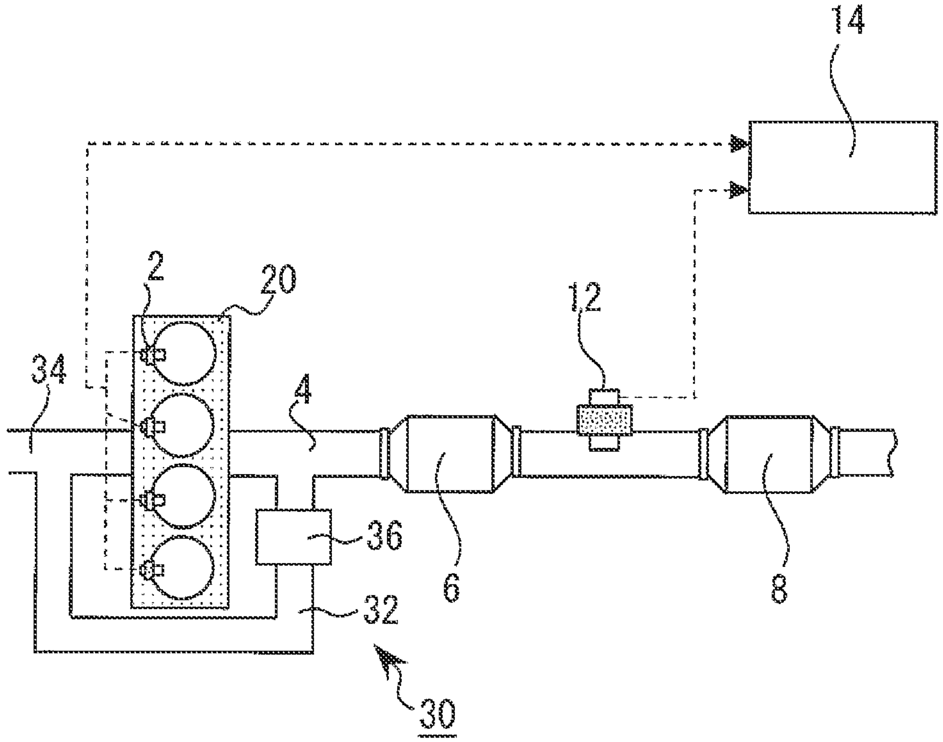
FIG. 16 is a schematic diagram for describing the overall configuration of the system according to Embodiment 7 of the present invention.

A system according to Embodiment 7 has the same configuration as the system of Embodiment 5, except that the system according to Embodiment 7 includes an EGR (exhaust gas recirculation) system. FIG. 16 is a schematic diagram for describing the overall configuration of the system according to Embodiment 7 of the present invention. As shown in FIG. 16, the internal combustion engine 2 includes an EGR system 30. The EGR system 30 is a system that causes part of the exhaust gas that flows through the exhaust passage 4 of the internal combustion engine 2 to be recirculated to an intake pipe 34 via an EGR pipe 32. An EGR valve 36 is installed in the EGR pipe 32. Opening and closing of the EGR valve 36 as well as the degree of opening thereof is controlled by a control signal from the control apparatus 14. Operation of the internal combustion engine 2 with EGR (on), without EGR (off), as well as the flow rate of exhaust gas when EGR is on are controlled by controlling the EGR valve 36.

EGR significantly influences parameters for air-fuel ratio detection when determining a CPS air-fuel ratio. Therefore, according to the present embodiment, the influence that turning EGR on or off has on the CPS air-fuel ratio is learned, and correction coefficients are set so as to reduce variations that are due to the influence of EGR. Note that the control that the system of Embodiment 7 performs is the same as the control performed by the system of Embodiment 6, except that detection of correction coefficients is separated into cases where EGR is on and cases where EGR is off.

Specifically, first, in an operating state in which EGR is off, as described in Embodiment 6, the air-fuel ratio is control so as to become predetermined air-fuel ratios for correction, CPS air-fuel ratios and AFS air-fuel ratios are detected, and correction coefficients are calculated.

Thereafter, as an operating state in which EGR gas is arbitrarily introduced, the other conditions are made the same as operating conditions when EGR is off. At this time, the control apparatus 14 detects the CPS air-fuel ratio and the AFS air-fuel ratio. In addition, a ratio of air-fuel ratios when EGR is off and a ratio of air-fuel ratios when EGR is on are compared under the same conditions, and the amount of change between the ratios is detected. A correction amount T with respect to the EGR amount is set in accordance with the amount of change.

The CPS air-fuel ratio after correction is calculated according to the following equation (3).

$$\text{Corrected CPS air-fuel ratio} = K \times \text{CPS air-fuel ratio} + T \times \text{EGR amount} \tag{3}$$

In the above equation, K represents a correction coefficient in a case where EGR is off. Further, T represents a correction amount of the CPS air-fuel ratio with respect to the EGR amount.

Figure 17:
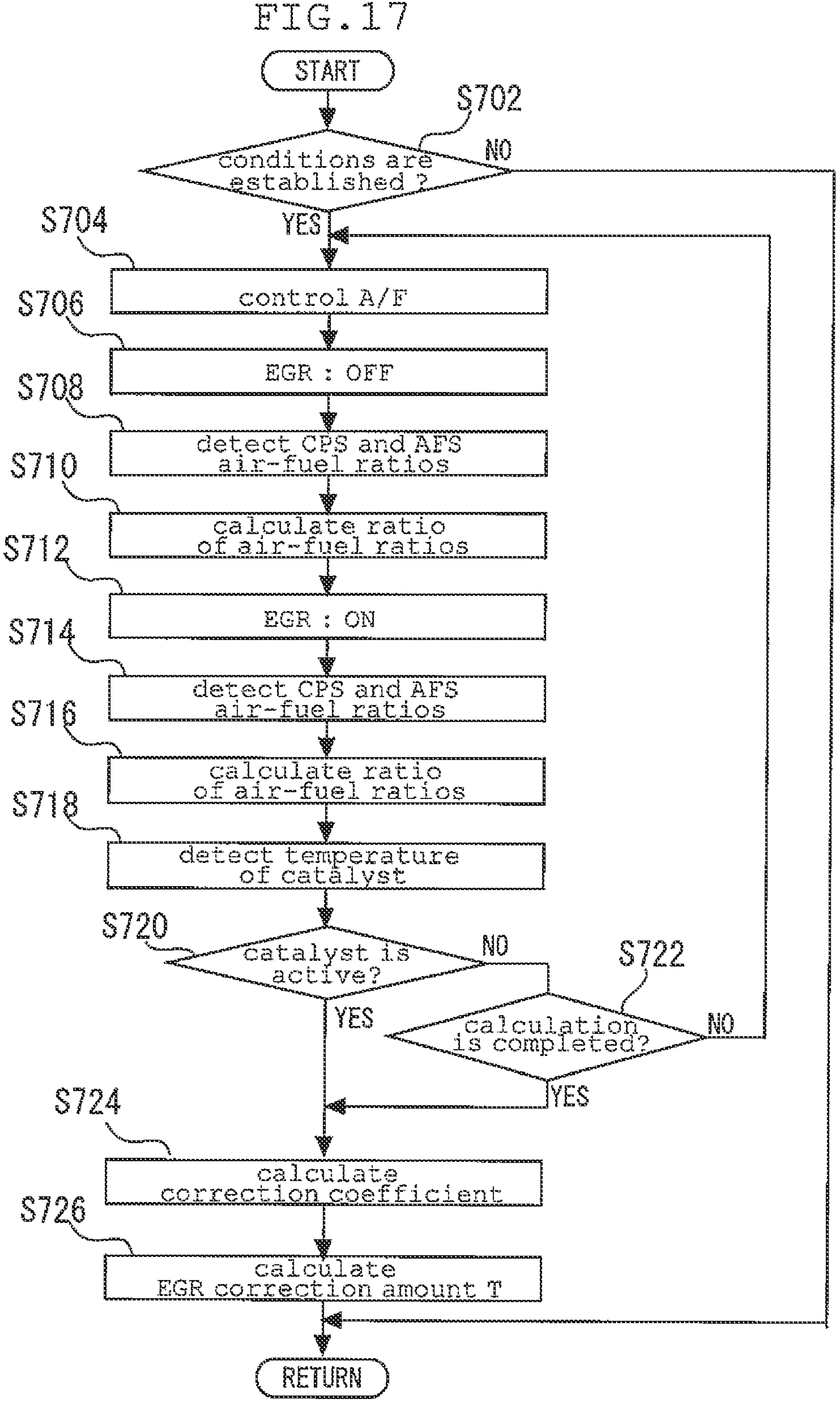
FIG. 17 illustrates a control routine that the control apparatus executes in Embodiment 7 of the present invention.

FIG. 17 illustrates a control routine that the control apparatus 14 executes in Embodiment 7 of the present invention. In the routine illustrated in FIG. 17, first, similarly to Embodiment 5, the control apparatus 14 determines whether or not preconditions are established (S702), and if the control apparatus 14 determines that preconditions are not established, the current processing ends. In contrast, if the control apparatus 14 determines that preconditions are established in step S702, next, the air-fuel ratio is set to an air-fuel ratio for correction that performs correction (S704). The air-fuel ratios for correction are predetermined air-fuel ratios that are previously set within a predetermined range as in Embodiment 6. Further, in this case it is effective to make the air-fuel ratios for correction air-fuel ratios that are on the rich side.

Subsequently, EGR is turned off (S706). In this state, similarly to Embodiment 6, detection of a CPS air-fuel ratio, detection of an AFS air-fuel ratio, and calculation of a ratio of the air-fuel ratios are performed (S708 to S710). Next, the EGR is turned on (S712). Similarly to steps S708 to S710, the CPS air-fuel ratio and AFS air-fuel ratio are detected and the ratio of the air-fuel ratios is calculated (S714 to S716).

Next, the catalyst temperature is detected (S718), and the control apparatus 14 determines whether or not catalytic activity is observed (S720). If catalytic activity is not observed, the control apparatus 14 determines whether or not calculation of a ratio of air-fuel ratios has been completed for all of the air-fuel ratios for correction (S722).

If the control apparatus 14 determines that calculation of ratios of air-fuel ratios is not completed, the air-fuel ratio is controlled to another air-fuel ratio for correction (S704), and execution of the processing of steps S706 to S720 is repeated. In contrast, if catalytic activity is observed in step S720, or if the control apparatus 14 determines in step S722 that calculation of the ratios of air-fuel ratios is completed, the control apparatus 14 calculates correction coefficients in step S724.

Further, a correction amount T with respect to the EGR amount is calculated based on a ratio of the air-fuel ratios when EGR is on and when EGR is off under the same conditions (S726). Thereafter, the current processing ends.

As described above, in Embodiment 7 a correction amount is calculated when EGR is on. Accordingly, even in a case where EGR is on and variations are liable to arise in the CPS air-fuel ratio, the CPS air-fuel ratio can be corrected more appropriately.

In the present embodiment 7, a case has been described in which air-fuel ratios for correction are set, and correction coefficients with respect to each of the air-fuel ratios for correction are set for a case where EGR is on and a case where EGR is off. However, the present invention is not limited thereto, and a configuration may also be adopted in which air-fuel ratios for correction are calculated only for a rich side. Further, a configuration may be adopted in which the processing of steps S706 to S724 is executed not only in a case in which an air-fuel ratio is controlled to be an air-fuel ratio for correction, but is also executed with the air-fuel ratio as it is in the relevant operating state.

Further, the calculation of correction coefficients for cases where EGR is on and EGR is off according to the present embodiment 7 can also be applied, for example, to Embodiment 5. In this case, it is sufficient to determine, for each region described in Embodiment 5, ratios of air-fuel ratios for a case where EGR is turned on and a case where EGR is turned off, respectively, and set a correction amount T with respect to the EGR amount for each region by comparing the ratios of air-fuel ratios for each region.

It is to be understood that even when the number, quantity, amount, range or other numerical attribute of an element is mentioned in the above description of the embodiments, the present invention is not limited to the mentioned numerical attribute unless it is expressly stated or theoretically defined. Further, structures and the like described in conjunction with the embodiments are not necessarily essential to the present invention unless expressly stated or theoretically defined.

DESCRIPTION OF NOTATIONS

2 internal combustion engine
6,8 catalyst
10 air-fuel ratio sensor (Fr sensor)
12 air-fuel ratio sensor (Rr sensor)
14 control apparatus
20 in-cylinder pressure sensor
30 EGR system

The invention claimed is:

1. A sensor characteristic correction device, comprising:

characteristic detection means that detects a characteristic of a first sensor that is an air-fuel ratio sensor that is arranged upstream of a catalyst in an exhaust passage of an internal combustion engine, and a characteristic of a second sensor that is an air-fuel ratio sensor that is arranged downstream of the catalyst;

calculation means that calculates a first air-fuel ratio based on the characteristic of the first sensor and calculates a second air-fuel ratio based on the characteristic of the second sensor;

difference detection means that, when the catalyst is in an inactive state after start-up of the internal combustion engine, detects a difference between the first characteristic and the second characteristic or a difference between the first air-fuel ratio and the second air-fuel ratio; and correction means that, in accordance with the difference, corrects a responsiveness of the first sensor or the second sensor.

2. The sensor characteristic correction device according to claim 1, wherein:

the characteristic detection means detects an output of the first sensor and an output of the second sensor as the characteristic of the first sensor and the characteristic of the second sensor, respectively;

the difference detection means detects a difference between the output of the first sensor and the output of the second sensor; and the correction means further corrects the output of the first sensor or the second sensor in accordance with the difference.

3. The sensor characteristic correction device according to claim 1, wherein:

the characteristic detection means detects responsiveness as characteristic of the first sensor and as characteristic of the second sensor, respectively;

the difference detection means detects a difference between the responsiveness of the first sensor and the responsiveness of the second sensor.

4. The sensor characteristic correction device according to claim 1, wherein the correction means takes the characteristic of the second sensor as a standard, and corrects the characteristic of the first sensor so that the first air-fuel ratio becomes the same as the second air-fuel ratio.

5. The sensor characteristic correction device according to claim 1, further comprising:

air-fuel ratio control means that, when the catalyst is in an inactive state after start-up of the internal combustion engine, controls an air-fuel ratio of the internal combustion engine to a predetermined rich air-fuel ratio or lean air-fuel ratio;

wherein the difference detection means detects a difference between the characteristic of the first sensor and the characteristic of the second sensor or a difference between the first air-fuel ratio and the second air-fuel ratio in a case where the air-fuel ratio is controlled to the rich air-fuel ratio or lean air-fuel ratio.

6. A sensor characteristic correction device, comprising a controller;

for detecting a characteristic of a first sensor that is an air-fuel ratio sensor that is arranged upstream of a catalyst in an exhaust passage of an internal combustion engine, and a characteristic of a second sensor that is an air-fuel ratio sensor that is arranged downstream of the catalyst;

for calculating a first air-fuel ratio based on the characteristic of the first sensor and calculates a second air-fuel ratio based on the characteristic of the second sensor;

for detecting, when the catalyst is in an inactive state after start-up of the internal combustion engine, a difference between the first characteristic and the second characteristic or a difference between the first air-fuel ratio and the second air-fuel ratio; and for correcting, in accordance with the difference, a responsiveness of the first sensor or the second sensor.

* * * * *